S. B. HAMILTON.
COMBINED LISTER, PLANTER, AND RIDGE BUSTER.
APPLICATION FILED AUG. 1, 1910.
1,002,683.
Patented Sept. 5, 1911.
4 SHEETS—SHEET 1.
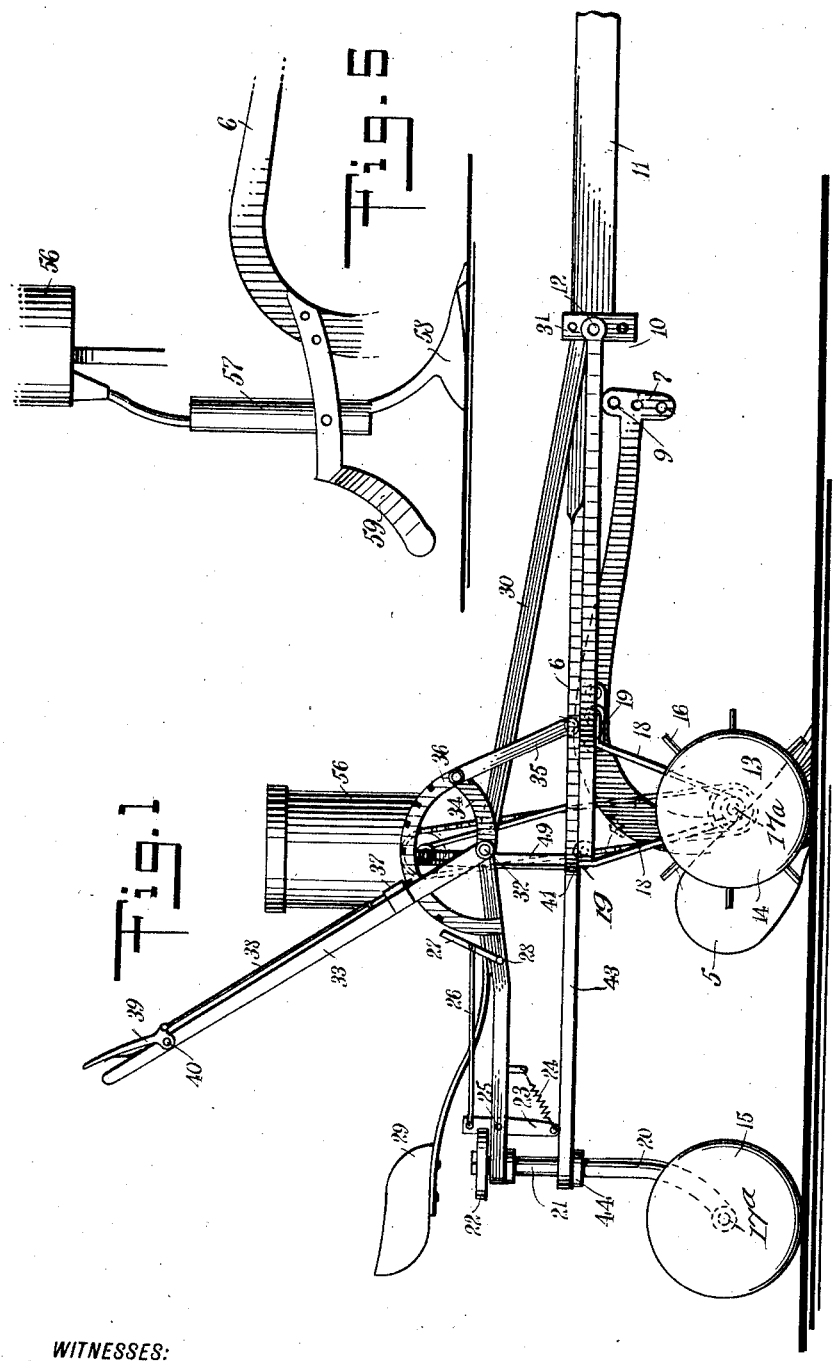
WITNESSES:
INVENTOR
Samuel B. Hamilton
BY
ATTORNEYS

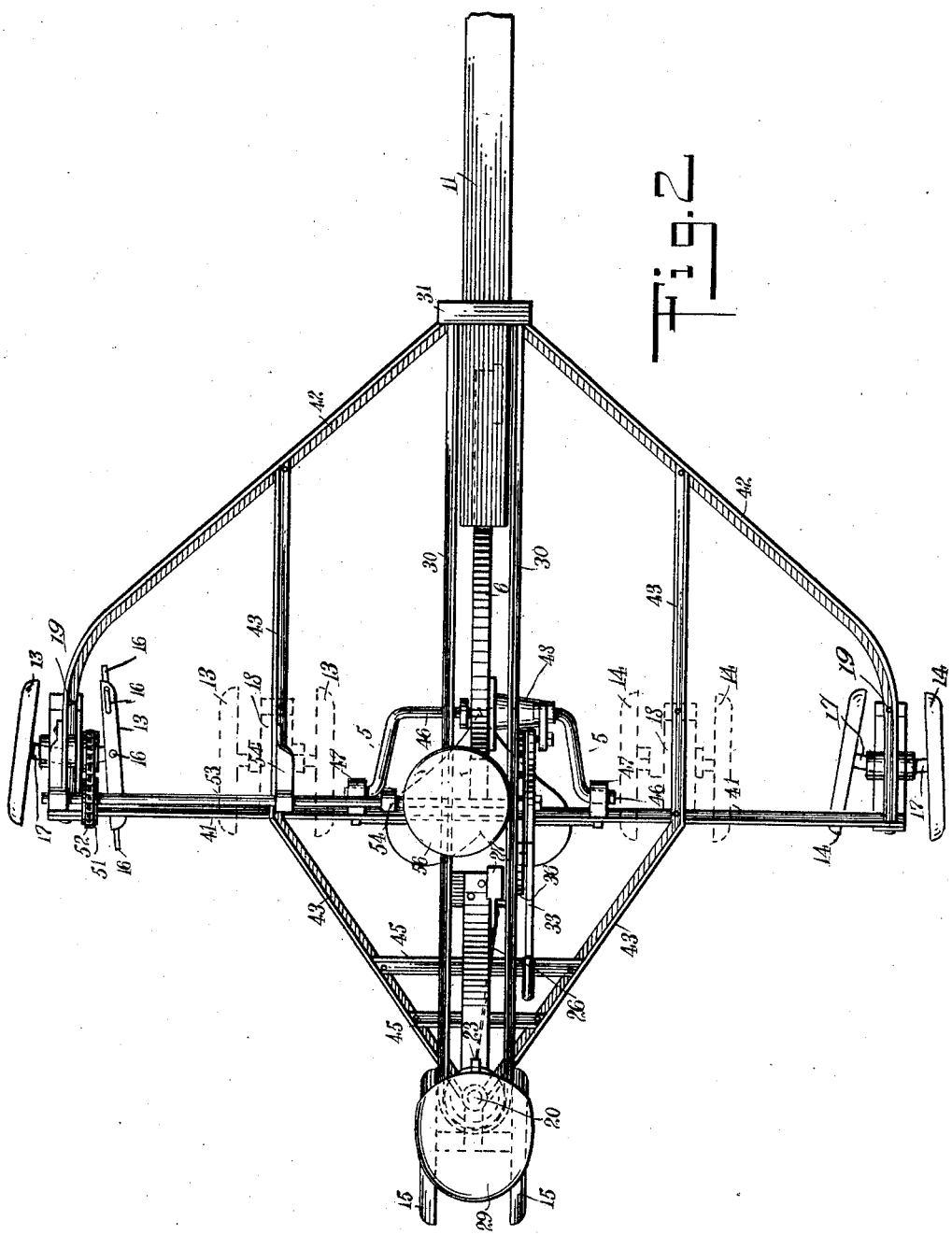

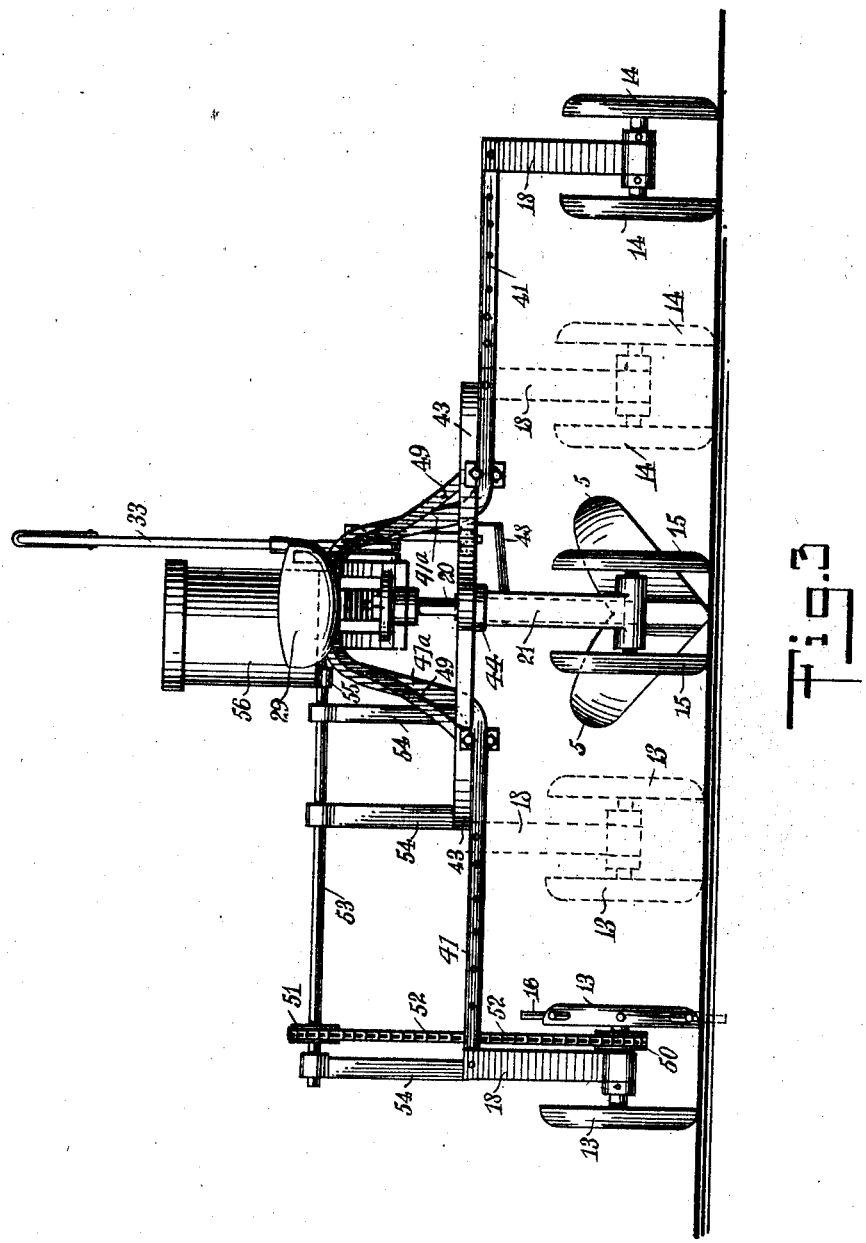

S. B. HAMILTON.
COMBINED LISTER, PLANTER, AND RIDGE BUSTER.
APPLICATION FILED AUG. 1, 1910.
1,002,683.
Patented Sept. 5, 1911.
4 SHEETS—SHEET 4.
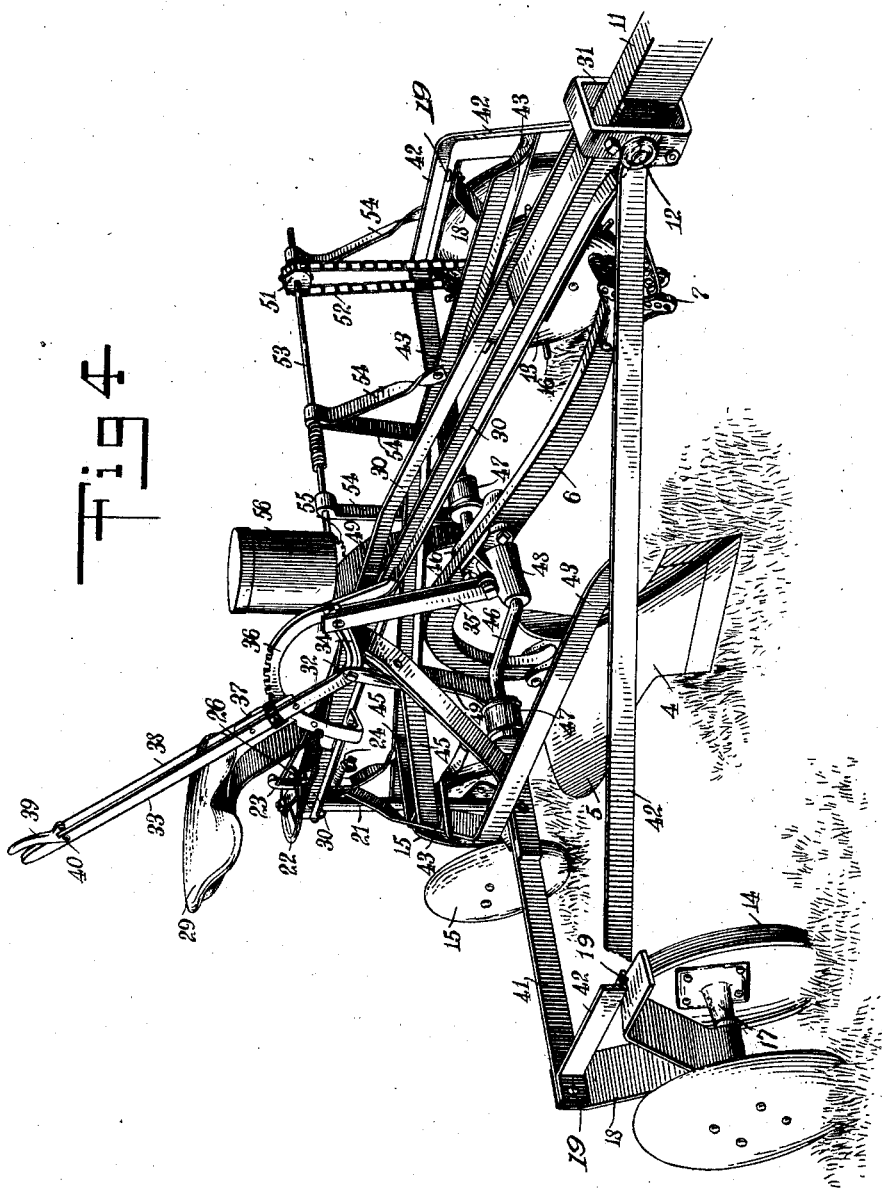

UNITED STATES PATENT OFFICE.

SAMUEL B. HAMILTON, OF WAKEFIELD, KANSAS.

COMBINED LISTER, PLANTER, AND RIDGE-BUSTER.

1,002,683.   Specification of Letters Patent.   Patented Sept. 5, 1911.

Application filed August 1, 1910. Serial No. 574,946.

*To all whom it may concern:*

Be it known that I, SAMUEL B. HAMILTON, a citizen of the United States, and a resident of Wakefield, in the county of Clay and State of Kansas, have invented a new and Improved Combined Lister, Planter, and Ridge-Buster, of which the following is a full, clear, and exact description.

Among the principal objects which the present invention has in view are: to provide a mechanism which may be adjusted to space the operation of a lister plow to form parallel ridges; to provide a frame for an implement of the character specified having strength, lightness and durability; to provide carrying wheels arranged to cause the wheels to track toward the center of furrows, to form a revolving wedge the rearward spread whereof bears against the sides of furrows and prevents the drift of the wheels and implement; and to provide a simple, durable, efficient and economical frame structure.

One embodiment of the present invention is disclosed in the structure illustrated in the accompanying drawings, in which like characters of reference denote corresponding parts in all the views, and in which—

Figure 1 is a side elevation of an implement of the character specified, constructed in accordance with the present invention; Fig. 2 is a plan view of the same; Fig. 3 is a rear elevation of the same; Fig. 4 is a perspective view of the same; and Fig. 5 is a detail view, fragmentary in form, showing a seed hopper, boot, sub-soiler, and coverer forming a planting attachment for an implement of the character specified.

Two chief results are attained in using a plow constructed as herein shown and described. These should be held in view for a clearer understanding of the following specification. Briefly stated, they consist in providing a wide spreading frame with carrying wheels therefor which may be adjusted laterally so that at least one set of said wheels rests in and tracks in a furrow, or between ridges made. When listing or ridge-forming, this insures the desired parallel arrangement of the ridges. Further, by means of this arrangement the implement may be adjusted so that the wheels track accurately on both sides of a ridge to hold the plow centered to break down the ridge, when performing the operation known as ridge "busting". To accomplish the above-stated results, the carrying wheels must be made to track accurately in the furrows. This result is accomplished in the present construction and constitutes the second of the above-mentioned results.

The lister plow 4 is constructed in the usual manner, the mold boards or wings 5, 5 being disposed to upturn the earth at both sides of the cut. The plow 4 is provided with a plow beam 6, at the forward end whereof is provided a clevis head 7, to receive a bolt 9. A tongue 11 is pivoted in the frame by means of a bolt 12, so that the same is permitted to rock on the said bolt.

The implement is of the sulky type, and is carried on wheels 13, 14 and 15. The wheels 13, 14 and 15 are arranged in pairs, and are identical in form, except that one of the wheels 13 is provided with a series of spikes 16, 16 projected beyond the periphery of the said wheel 13. The purpose of these spikes 16 will be hereinafter more fully set forth. The wheels 13, 14 and 15 are constructed as hollow disks having curled felly edges. The disks are solid faced to provide surfaces to bear against the sides of the adjacent ridges. These sides are curled inward at the lower edge, to present sides which slide on the sides of the ridges forming the furrows, the solid faces performing this function better than open or spoke formed wheels. The disks are preferably provided with bearing boxes 17, bolted rigidly thereto, whereby the said boxes may be removed, repaired, or replaced. The said boxes hold in bearing relation the wheel spindles $17^a$. The spindles $17^a$ are approximately twelve inches long and are bent slightly forward and on a horizontal plane so that the edges of the said wheels are slightly converged at the forward edges. The spindles are fixedly secured on the bracket standards 18, 18. The standards 18, 18 are each provided with a foot horizontally disposed below the frame of the machine, to which it is secured by bolts 19.

The rear wheels 15 are provided with a vertical caster arm 20, formed substantially as shown in Fig. 1 of the drawings to extend rearwardly of the bearing for the said wheels, and having a vertical mounting extension. The vertical extension of the caster arm 20 is pivoted within a hollow tube 21, fixedly mounted on the frame of the machine, and at the rear of the plow 4. The upper end of the arm 20 is provided with a disk 22, fixedly secured to the said arm, and having peripheral slots wherein a latch blade 23 is normally forced by a spring 24. The blade 23 is pivoted at 25, and is withdrawn from contact with the said disk by means of a pull rod 26. The rod 26 is pivotally attached to a foot lever 27, which is pivotally mounted at 28 on the carrying frame, and within reach of the foot of the driver of the machine when seated on the seat 29.

The frame structure consists of a longitudinally disposed brace 30. The brace 30 is constructed from suitable material, preferably angle iron, and bent to form parallel extensions, said brace being bent at the extreme rear and extended to the front of the implement, where the ends of the said braces are fixedly attached to a square collar 31. Where the brace 30 is bent upon itself at the rear of the implement it is formed around the tube 21, to which it is fixedly attached to serve as a brace for the said tube. The brace 30 is upwardly extended to form a longitudinally disposed arch, at the apex whereof is mounted a pivot bolt 32, upon which is pivotally mounted a lifting lever 33. The short end 34 of the lifting lever 33 is connected by a link 35 with the plow beam 6. The brace 30, further serves to form a support for a quadrant 36, the ends whereof are bolted to the said brace 30. The quadrant 36 has a series of teeth wherein a detent bolt 37 strikes, which bolt 37 is controlled by a draw rod 38. The draw rod 38 is pivotally connected to a grip rocking lever 39, which is pivoted at 40 upon the lever 33. It is by means of the lever 33 that the plow 4 is lifted from or lowered into the earth. Also, thereby, the depth of operation of the plow is adjusted and controlled.

The lateral framing bar 41 is constructed preferably from flat bar material, and at the median line of the implement passes above the brace 30 in an arch 41ª. The frame bar 41 is rigidly bolted to the hound bars 42, 42, the forward ends of which are securely bolted to the collar 31. The bars 42, 42 may be thus secured by the bolt 12, or, if preferred, be independently and fixedly attached to the said collar. Adjacent to the rear ends of the hound bars 42 are provided longitudinal straightened sections to form a bearing for the standards 18, 18 of the carrying wheels 13, 13 and 14, 14. To further brace the structure, and to provide supporting means for the caster arm 20, a bar 43 is provided. The ends of the bar 43 are fixedly connected to the forward converging sections of the bars 42, 42, being secured at the median line of the said converging sections. They are extended from the point of securement with the said converging sections across the bar 41 in parallel relation to the brace 30. From the points of attachment of the bar 43 with the bar 41, the said bar 43 is converged and bent at the rearmost extremity around the tube 21, being fixedly secured to the said tube at that point. The caster arm 20 is provided with a bearing collar 44, which reaches under the bar 43 where the same passes around the said tube 21. To render the angular formation of the bar 43 at the rear of the implement more solid, there is provided a tool box, formed by extending across the angle of the bar 43 brace bars 45, 45, which are provided with vertically extended side flanges, and horizontal flanges from the lower edge thereof, upon which is supported a suitable bottom or filling piece to form a receptacle for the carrying of tools usual in the handling of an implement of the character specified.

The plow beam 6 is directly connected with a bail lever 46, the median section whereof is passed through a perforation in the said plow beam, and the ends whereof are outwardly turned and mounted in bearing lugs 47, 47, securely bolted in position upon the cross brace 41. It is to the lever 46 that the link 35 is directly connected. This connection steadies the operation of the plow when the same is lifted by the lever 33.

An extended boss 48 is rigidly secured to the beam 6 and bored to form an elongated bearing for the median section of the bail lever 46. The lateral extensions of the bar 41 are connected by an arch 49, disposed at the median section of the said bar 41, and fixedly connected in structural relation with the brace 30.

One of the wheels 13, as above stated, is provided with a series of spikes 16, 16, extended from the periphery or felly thereof. These spikes are provided to engage the earth in holding and firm traction relation therewith. The hub of the wheel 13 is provided with a sprocket wheel 50 fixedly mounted thereon. Said hub is removable. The sprocket wheel 50 is connected with a sprocket wheel 51 by means of a chain 52. The wheel 51 is fixedly mounted upon a horizontally disposed countershaft 53. The shaft 53 is supported on standards 54, 54, and is operatively connected at the inner end of the said shaft by means of a gear wheel 55 with the dropper plate of the planting mechanism of which a hopper 56 forms a part. The hopper 56 is disposed in the rear of the plow 4. In operation, the seed is delivered from the said hopper through the boot 57, into the bottom of a furrow formed by the subsoiler 58, which follows in the rear of the plow 4. Any suitable seed covering device 59 is used in connection with the implement.

As the title indicates, the implement herein described may be used for what is termed "ridge busting." When it is desired to break down the ridges, the adjustment of the wheels 13, 13, and 14, 14, is made by shifting them to the position shown by dotted lines in Figs. 2 and 3 of the drawings. In this position, the standards 18, 18, are bolted to the bars 41 and 43, so that the wheels 13 and 14 are held firmly in position. When thus shifted the said wheels 13 and 14 track in the bottom of adjacent furrows, and maintain the plow 4, in line with the center of the ridge between the said furrows.

It will be understood that, when lister plowing, one pair of the wheels 13, 13 or 14, 14, runs in a furrow, and the other pair of wheels tracks on the unplowed land. By this means the spacing of the ridges is perfect.

Having thus described my invention, what I claim as new and desire to secure by Letters Patent is: —

An implement of the character specified, comprising a carrying frame having two parallel longitudinally disposed framing bars; a guiding tongue pivotally mounted in guiding relation between said bars; a laterally extended frame structurally connected with said bars; suitable structural braces for maintaining the structural rigidity of said bars; forwardly converged side braces for said frame structurally connected with said longitudinally disposed bars; a lister plow carried under said frame and in supported relation thereto; means for raising said plow on said frame; and carrying wheels to support said frame, said wheels being adapted to track in furrows, and further arranged to be adjusted laterally on said frame to vary the operative position of the said plow.

In testimony whereof I have signed this specification in the presence of two subscribing witnesses.

SAMUEL B. HAMILTON.

Witnesses:
  OTIS D. SWENSON,
  ERIC H. SWENSON.

---

Copies of this patent may be obtained for five cents each, by addressing the "Commissioner of Patents, Washington, D. C."